April 28, 1964  K. G. ÅHLÉN  3,130,481
METHOD OF MANUFACTURING A BLADE WHEEL
Filed March 11, 1960  2 Sheets-Sheet 1
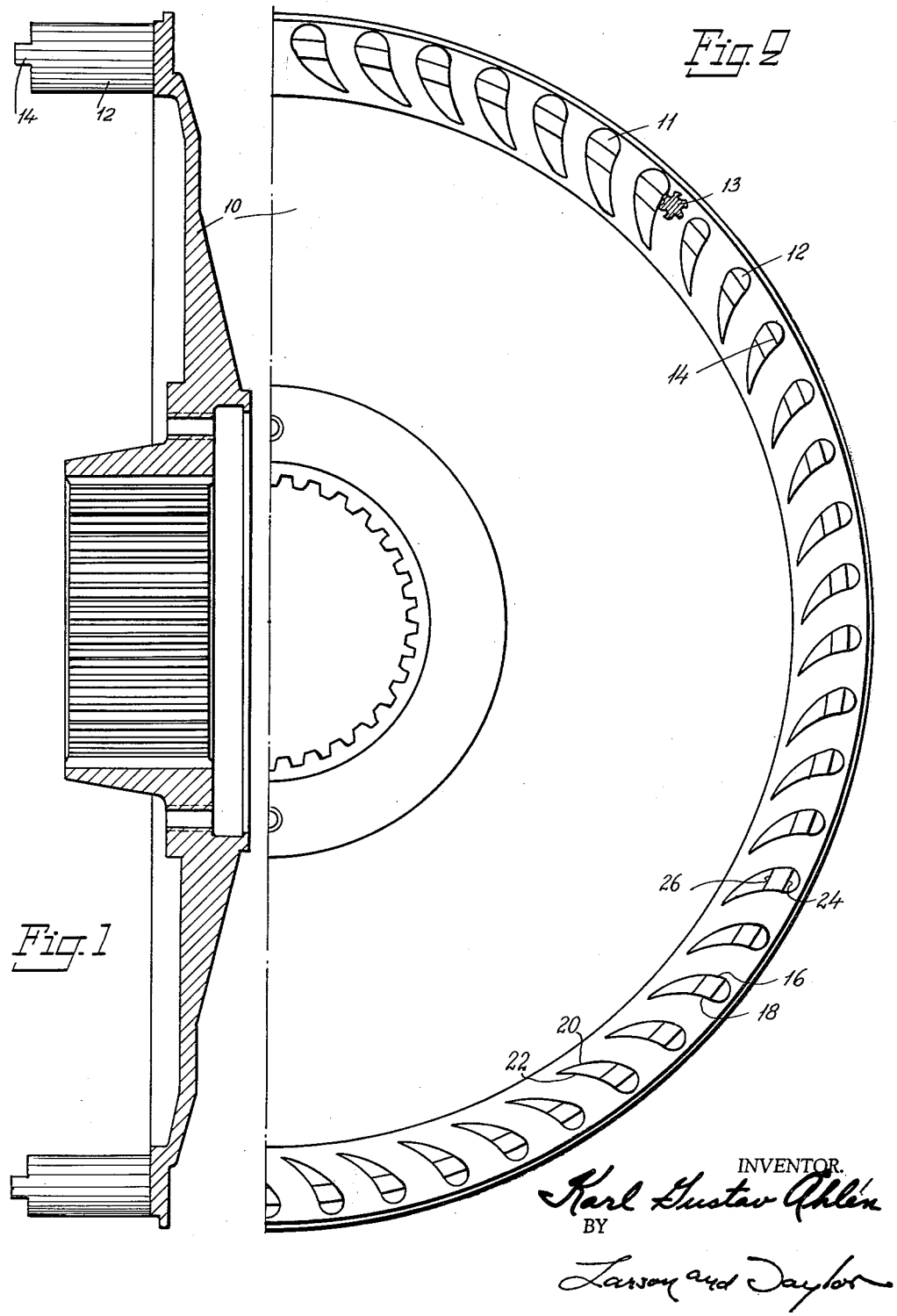

April 28, 1964  K. G. ÅHLÉN  3,130,481
METHOD OF MANUFACTURING A BLADE WHEEL
Filed March 11, 1960  2 Sheets-Sheet 2
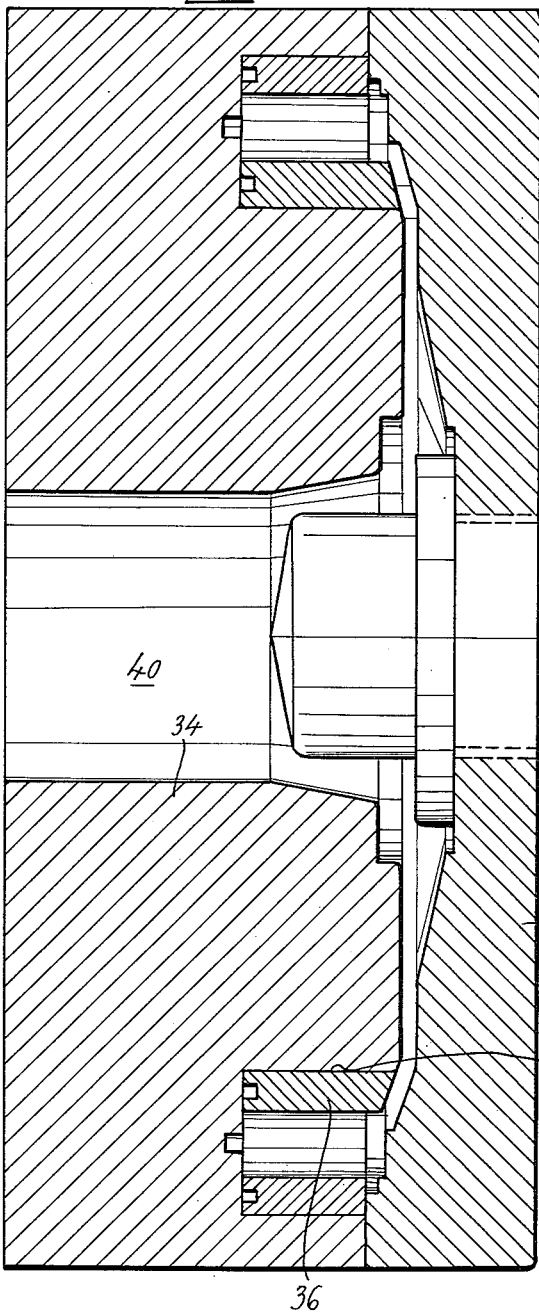
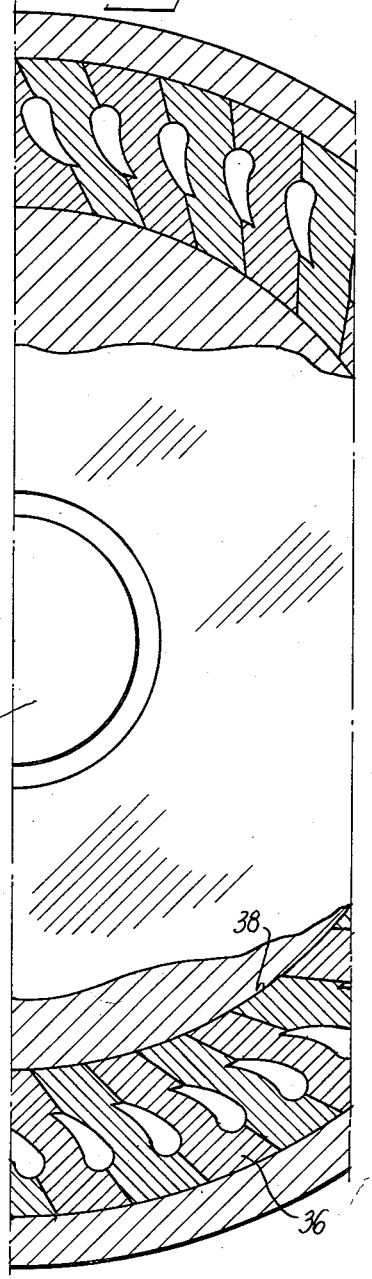
INVENTOR.
Karl Gustav Åhlén
BY
Larson and Taylor

United States Patent Office 3,130,481
Patented Apr. 28, 1964

3,130,481
METHOD OF MANUFACTURING A BLADE WHEEL
Karl Gustav Åhlén, Fridhemsgatan 2,
Stockholm K, Sweden
Filed Mar. 11, 1960, Ser. No. 14,474
Claims priority, application Sweden Mar. 14, 1959
6 Claims. (Cl. 29—156.8)

Manufacture of blade wheels comprising a disk provided with at least one ring of axial blades, and a ring connecting the blade ends spaced from the disk, has previously been an intricate and expensive operation. A method of manufacturing blade wheels of this kind heretofore has been to separately make the disk, ring, and the different blades to then later assemble them into one unit by riveting. In doing so it has been necessary to provide each blade with at least one tap on each end and to drill holes in the disk and ring corresponding to said taps. The holes in the disk must be drilled by boring, which necessitates great accuracy in order to obtain the exact pitch and exact blade angles, and the taps must be made by turning each blade separately.

Another method has been to manufacture a blank in the shape of a disk provided with a continuous annular projection from which the blades have been cut. The machining required by this method is as follows.

First the disk of the blank must be turned to set up the blank for milling.

Then a rough-milling operation to cut away most of the material between the blades and a following finished cutting operation at which the machining allowance is different at different parts of the blade.

As a consequence of the cutting off of the annular projection by the milling the distribution of the stresses of the blank is changed so that some distortion is thereby brought about in the disk. The disk must for this reason be turned once more as a finishing operation.

This method is time-consuming and expensive as it necessitates milling in at least two steps by different milling cutters and two quite separated turning operations.

By the present invention the manufacturing of a blade wheel of the axial blade type has been considerably simplified.

According to the present invention, a blank is produced by casting a blank which has the shape of a disk provided with a ring of separate axial projections, each uniform to but of slightly greater dimensions than the finished blade. Owing to the following machining it is suitable to use a casting method giving limited tolerances and only slight casting skin or no casting skin at all, e.g. shell casting, so that the wearing of the cutters as well as the machining time is decreased. Because of the possibility of attaching a ring to the tops of the blades it is furthermore preferred to use a material soft enough to allow riveting, e.g. nodular cast iron.

A blank produced in this way can be turned in one operaion to the desired dimensions of the disk.

Following the turning operation, each blade is cut to the whole of its length in a single operation by a milling cutter. The cutter is controlled by a pattern so that it cuts in a direction normal to the axis of the wheel.

By the present invention several considerable advantages are obtained as compared with the previously known method by which the blade projections consist of one single annular projection.

In the first place, the rough milling necessitated by previously known methods is eliminated so that the milling can be accomplished in a single step without changing the cutter.

In the second place, by the method of the invention a machining allowance of the projection is obtained which is substantially the same all around the blade while with the earlier method the machining allowance must vary from one point of the blade to the other as the rough milling cannot follow the profile of the blade. Since the material removed is the same all around the blade there is a steady stress of the cutter so that it can be used in a very rational way with a regular feed. The machining time of the cutter therefore is as short as possible. The cost of the milling is also in this way reduced to a minimum.

In the third place, by casting the blade projections separately, the removal of an annular projection of the blank is avoided so that the distribution of the stresses of the blank are unaltered and every distortion of the disk owing to change of the stresses is avoided. Thus the disk can be completely turned in a single operation before milling and any subsequent turning after milling is superfluous.

It has proved to be advantageous to make the blades so that different sections taken parallel to the disk have uniform profiles but, with decreasing distances to the disk, increasing dimensions. Thus the projections when casting get an advantageous angle of clearance, and the strength of the blades increases closer to the disk without affecting appreciably the fluid flow in the finished blade wheel.

Furthermore, it is necessary to provide the blade tops—in this connection regarding the blade ends diverted from the disk—with taps in order to fasten a ring joining the blade tops. It has proved to be advantageous to make the cast blank with tap-shaped projections on the top of the blade projections. The tap-shaped projections are machined on their radial surfaces during the milling of the blade profiles and on their circumferential surfaces by a turning operation common for all blades. By said turning operation the blade tops are planed and the circumferential sides of the taps are turned. The rings with holes corresponding to the taps are suitably made by punching in one operation, whereby the parts of the tool corresponding to the tap holes can be manufactured by turning an annular projection which then is divided by milling in taps corresponding to the different holes. Owing to this fact the punching tool will be comparatively cheap to manufacture. By punching the holes become slightly conical, which, however, is desirable, as the blade taps after laying on the ring are clinched, whereby the taps are deformed so that their heads become slightly conical which is advantageous for a positive retaining of the ring.

Because of the dimensions of the ring connecting the blade tops, especially its thickness, it is not always possible to make the holes by punching. The holes must for said reasons be drilled and the taps of the blades must be of cylindrical shape. The manufacturing of said cylindrical taps is carried out by a drilling tool giving a cylindrical tap instead of a cylindrical hole. Said tool is suitably located on the milling machine, so that the tap can be drilled in a first operation and the blade profile can be cut as described above in a second operation.

The invention also includes blade wheels manufactured according to the invention. Blade wheels of this kind are especially suitable for hydraulic transmissions, in which several blade rings with a great number of blades are arranged, and where it is important to reduce the cost of the comparatively expensive blade systems as much as possible in order to obtain prices competitive with other transmission types.

A more detailed description of the invention will be given below in conjunction with the attached drawings.

FIG. 1 shows a longitudinal section through a wheel manufactured according to the invention and FIG. 2 a partial front view of the wheel in FIG. 1. FIG. 3 shows a longitudinal section through the mould for casting according to the invention and FIG. 4 a partial cross section through the mould according to FIG. 3.

On FIGS. 1 and 2 number 10 indicates a disk provided with a ring of blade projections 11 or blades 12, each one provided with a tap 14. Each blade projection 11 is cut along the whole length of the blade in a single operation by a milling cutter 13. The taps are provided with radial surfaces 16 and 18 which coincide with the side surfaces 20 and 22 of the blades 12 and are machined to final shape together with said blades, and circumferential cylindric surfaces 24 and 26 which are machined to final shape by turning around the axis of the disk 10.

FIGS. 3 and 4 show a mould suitable for the invention and comprising two main parts 32 and 34. In the part 34 a number of profiled pieces 36 are arranged which are made of synthetic resin or other suitable material and provided with recesses on their faces, whereby the two recesses of each piece correspond to two consecutive blade halves provided with additions giving machining allowance. Said profiled pieces 36 are arranged in an annular recess 38 in the part 34 and form moulds for blade projections. The part 34 is furthermore provided with a gate 40.

The features of the blade wheel and mould shown are only to be conceived as examples and not intended to limit the invention which includes all procedures and devices that come within the scope of the following claims.

I claim:

1. Method of manufacturing a blade wheel by casting a blank having the shape of a disk provided with a ring of individual axial projections, each of uniform width along the axial length thereof but of slightly greater dimensions than the finished blade, by machining the disk to final shape, and by cutting the whole length of each blade in a single operation by a milling cutter controlled by a pattern to cut in directions normal to the axis of the wheel.

2. Method according to claim 1 by which the casting is performed according to a method such as shell casting which causes no cast skin on the blank.

3. Method according to claim 1 in which the blank is made from nodular cast iron.

4. Method according to claim 1 in which the blades are machined to a profile uniform along its total axial length but with dimensions increasing against the disk.

5. Method according to claim 1 in which each blade at its end spaced from the disk is provided with a tap which is machined by turning its circumferential surfaces and by cutting its radial surfaces in the same operation as the cutting of the blade profile.

6. Method according to claim 1 in which each blade at its end spaced from the disk is provided with a cylindrical tap which is machined by a drilling tool before the milling of the blade profile.

References Cited in the file of this patent

UNITED STATES PATENTS

| | | |
|---|---|---|
| 1,495,222 | Clark | May 27, 1924 |
| 2,138,814 | Bressler | Dec. 6, 1938 |
| 2,173,713 | Fottinger | Sept. 19, 1939 |
| 2,479,039 | Cronstedt | Aug. 16, 1949 |
| 2,633,776 | Schenk | Apr. 7, 1953 |
| 2,751,292 | Bogart et al. | June 19, 1956 |
| 2,923,988 | Baker | Feb. 9, 1960 |

FOREIGN PATENTS

| | | |
|---|---|---|
| 1,019,318 | Germany | Apr. 28, 1954 |
| 495,846 | Italy | Nov. 14, 1952 |